United States Patent [19]

Elwakil

[11] Patent Number: 5,543,219
[45] Date of Patent: Aug. 6, 1996

[54] ENCAPSULATED MAGNETIC PARTICLES PIGMENTS AND CARBON BLACK, COMPOSITIONS AND METHODS RELATED THERETO

[75] Inventor: Hamdy A. Elwakil, Hoffman Estates, Ill.

[73] Assignee: A.B. Dick Company, Niles, Ill.

[21] Appl. No.: 447,683

[22] Filed: May 23, 1995

Related U.S. Application Data

[63] Continuation of Ser. No. 334,808, Nov. 4, 1994, abandoned, which is a continuation of Ser. No. 909,977, Jul. 7, 1992, abandoned, which is a continuation-in-part of Ser. No. 879,936, May 8, 1992, abandoned.

[51] Int. Cl.$^6$ .......................... B32B 5/16; C09D 11/00; C04B 35/04
[52] U.S. Cl. .................. 428/402.24; 106/20 R; 252/62.54; 428/402; 428/407
[58] Field of Search .................. 252/62.54; 428/402.24, 428/402; 106/20

[56] References Cited

U.S. PATENT DOCUMENTS

| | | | |
|---|---|---|---|
| Re. 34,145 | 12/1992 | Martin | 523/205 |
| 3,264,272 | 8/1966 | Rees | 260/78.5 |
| 3,330,693 | 7/1967 | Rumberger | 117/161 |
| 3,490,750 | 1/1970 | Brennan, Jr. | 259/104 |
| 3,618,902 | 11/1971 | Brennan, Jr. | 259/6 |
| 3,627,682 | 12/1971 | Hall et al. | 252/62.54 |
| 3,775,352 | 11/1973 | Leonard | 260/2.5 |
| 3,890,285 | 6/1975 | Sumita et al. | 260/78.50 |
| 4,049,871 | 9/1977 | Ogawa et al. | 428/425 |
| 4,310,565 | 1/1982 | Lehner et al. | 427/48 |
| 4,378,998 | 4/1983 | Korbanka et al. | 106/270 |
| 4,420,540 | 12/1983 | Ogawa et al. | 428/457 |
| 4,472,455 | 9/1984 | Kohl et al. | 427/48 |
| 4,511,629 | 4/1985 | Konno et al. | 428/522 |
| 4,562,117 | 12/1985 | Kikukawa et al. | 428/407 |
| 4,608,401 | 8/1986 | Martin | 523/205 |
| 4,668,586 | 5/1987 | Kohl et al. | 428/411.1 |
| 4,687,705 | 8/1987 | Miyatsuka et al. | 428/329 |
| 4,696,859 | 9/1987 | Miyoshi et al. | 428/323 |
| 4,699,817 | 10/1987 | Fujiki et al. | 428/64 |
| 4,713,293 | 12/1987 | Asano et al. | 428/403 |
| 4,766,051 | 8/1988 | Breton et al. | 430/138 |
| 4,771,086 | 9/1988 | Martin | 523/205 |
| 4,844,991 | 7/1989 | Miura et al. | 428/694 |
| 4,935,456 | 6/1990 | Huang et al. | 523/201 |
| 4,944,802 | 7/1990 | Chagnon et al. | 106/20 |
| 4,970,117 | 11/1990 | Duvdevani et al. | 428/334 |
| 5,013,602 | 5/1991 | Yamazaki et al. | 428/323 |
| 5,032,428 | 7/1991 | Ogawa et al. | 427/130 |
| 5,045,428 | 9/1991 | Sacripante et al. | 430/138 |
| 5,080,986 | 1/1992 | Kmiecik-Lawrynowicz et al. | 430/39 |
| 5,122,188 | 6/1992 | Erhan et al. | 106/28 |

FOREIGN PATENT DOCUMENTS

| | | |
|---|---|---|
| 0104498 | 4/1984 | European Pat. Off. . |
| 0154739 | 9/1985 | European Pat. Off. . |
| 2914659 | 10/1980 | Germany . |
| 950443 | 2/1964 | United Kingdom . |
| 1156653 | 7/1969 | United Kingdom . |

OTHER PUBLICATIONS

Van Nostrand Reinhold 1988 Edition "The Printing Ink Manual".
Wiley 1983 Edition "Chemistry of Pigments and Fillers".
Patent Abstracts of Japan, vol. 6, No. 22, Feb. 9, 1982.
Patent Abstracts of Japan, vol. 8, No. 192, Sep. 4, 1984.
Patent Abstracts of Japan, vol. 13, No. 543, Dec. 6, 1989.
Patent Abstracts of Japan, vol. 14, No. 144, Mar. 19, 1990.
Patent Abstracts of Japan, vol. 14, No. 416, Sep. 7, 1990.

*Primary Examiner*—James J. Seidleck
*Assistant Examiner*—Terressa M. Mosley
*Attorney, Agent, or Firm*—Leydig, Voit & Mayer, Ltd.

[57] ABSTRACT

Encapsulated particles, such as magnetic particles, colored pigments, or carbon black, with high chemical affinity for ink vehicles. The encapsulated particles of this invention are suitable for printing inks, as well as for magnetic recording systems, such as audio and video tapes and magnetic storage disks, when the encapsulated particles are magnetic particles. The encapsulated particles comprise particles having a coating on their surface, said coating comprising in one embodiment an ionomer and in another embodiment, an oil, such as soya oil, and optionally a thixotropic agent, and/or a binder resin. The method of the present invention for making such encapsulated particles avoids the use of volatile organic solvents and provides printing inks and coating compositions comprising such encapsulated particles, that also avoid the use of volatile organic solvents. Inks may be readily formulated without the need for the complicated and expensive flushing process, by simply dispersing the encapsulated colored pigment or carbon black in the desired vehicle.

7 Claims, No Drawings

ENCAPSULATED MAGNETIC PARTICLES PIGMENTS AND CARBON BLACK, COMPOSITIONS AND METHODS RELATED THERETO

This is a continuation of applications Ser. No. 08/334,808 filed on Nov. 4, 1994, now abandoned which is a continuation of U.S. Ser. No. 07/909,977, filed Jul. 7, 1992, now abandoned which is a C-I-P of U.S. Ser. No. 07/879,936, filed May 8, 1992, abandoned.

FIELD OF THE INVENTION

The present invention relates to the field of magnetic particles, generally, and specifically to the field of encapsulated magnetic particles and applications therefor, such as magnetic recording media, including tapes and discs for storage of sound or data. The present invention also relates to the field of printing and inks useful therefor, generally, as well as specifically to the field of lithographic printing and inks useful therefor. Further, the present invention relates to the field of encapsulated pigments and encapsulated carbon black, for use in printing inks and other applications, such as toners, coatings and paints.

BACKGROUND OF THE INVENTION

U.S. Pat. No. 5,080,986 relates to a magnetic encapsulated dry toner comprising a fluorocarbon-incorporated poly(lauryl methacrylate) as core binder. The capsules shell is either polyurea, polyamide, polyurethane, polyester, or mixtures of thereof, formed by interfacial polymerization at the oil (capsules)/water (carrier medium) interface. The capsules were prepared first in an aqueous medium then spray dried to form the dry toner. The spray drying is an ineffective and costly process, during which capsules, ruptures and/or agglomeration took place. In addition, dry capsules produced by this technique show very low yield.

Brit. Patent No. 1,156,653 relates to a process of encapsulating iron oxide by dispersion polymerization, during which the iron oxide is dispersed in an organic liquid together with a monomer (the monomer is soluble in the organic liquid). Upon polymerization (the polymer is insoluble in the organic liquid) the polymer precipitates from the organic liquid, and is absorbed on the surface of the iron oxide particles.

Brit. Patent No. 950,443 relates to a process to encapsulate iron oxide dispersions in organic solvent with a polymeric skin. The polymeric skin is formed by condensation polymerization.

Encapsulated magnetic particles are also disclosed in U.S. Pat. No. 3,627,682. In accordance with that patent, the encapsulating shell wall material is dispersed in a volatile solvent, which solvent is thereafter removed to form the encapsulated particles. Such an approach is undesirable because it involves the requirement of vaporizing a large amount of volatile solvent, which is both costly as well as potentially injurious to the environment. U.S. Pat. Nos. 4,420,540, 4,511,629, 4,696,859, 4,699,817, 4,713,293, 4,844,991, 5,013,602, and 5,032,428 are directed to magnetic recording media that contain nonencapsulated magnetic particles that are dispersed in a binder and then directly applied as a dispersion to a substrate, the dispersion also using volatile organic solvents.

Offset magnetic printing inks typically use iron oxide pigment as a source for magnetic signals. In order to achieve the required signal strength, the offset inks should contain a high loading of the iron oxide pigment (40–65% based on the total weight of the ink), but such high loading of iron oxide pigment adversely affects the performances of the magnetic printing inks, such as printability, press stability, ink transfer on the roller, ink water balances, drying time, as well as the stability of the magnetic signal.

In addition, the high loading of the iron oxide pigments make it necessary to pass the ink several passes over the three roll mill, at high pressure between the rollers, in order to disperse the magnetic pigment in the ink's vehicle. The three roll mill does not produce an agglomeration-free magnetic inks, due to the lack of chemical affinity between the pigment particles and the ink vehicle. In addition, this mechanical dispersing aid is very costly and time consuming, which adds to the cost of the final ink. Other mechanical dispersing aids, such as a SCHOLD mixer, does not completely eliminate pigment agglomeration. Agglomerations of magnetic iron oxide pigments reduce the magnetic signal strength, and produce an ink with poor runnability on the press. In order to achieve the required signal strength, more inks must be applied during printing. This in turn increase the press problems of the ink and has severe adverse effects on the print quality and the drying time.

Surface treatment techniques known in the prior arts do not produce a uniformly coated or treated magnetic particle. Performances of magnetic ink made with the commercially available treated, or untreated, iron oxide are marginal, lacking long run stability and nonreproducible. The resultant magnetic inks are stiff, short and lack of the proper transfer on the ink roller of the printing presses. In addition, the surface treatment itself is a very costly process.

Magnetic recording system are usually coated from a solvent based dispersion of magnetic particles. These dispersion required enormous amount of energy for curing. In addition undesirable air pollution accompany such the coating processes.

Encapsulated iron oxide and other magnetic particles for liquid toner and nonimpact printer applications contain large amounts of solvent which make them unsuitable for the lithographic printing inks.

From the foregoing it is clear that a significant need exists for encapsulated magnetic particles that may be used in any of the aforementioned application areas, such as printing (lithographic, offset, and the like), magnetic storage (tapes, discs, and the like), and others.

There also exists a significant need for making encapsulated magnetic pigments that can be used in the aforementioned application areas, that does not employ the use of volatile organic solvents. Further, such a method should be able to make encapsulated magnetic particles that have a high percentage of metal in the encapsulated product.

Additionally, there is a need for inks, such as for lithographic printing, that have a high percentage of encapsulated magnetic particles contained therein, that are free of volatile organic solvent, and can be employed without significant agglomeration of the magnetic particles. There is also a similar need for a coating composition for making magnetic recording media, wherein the coating composition has a high percentage of encapsulated magnetic particles contained therein, is free of volatile organic solvent, and can be employed without significant agglomeration of the magnetic particles.

Additionally, there is a need for a method of making inks that can avoid the costly preparation steps that are usually required, such as the flushing process that is employed in the manufacture of ink using flushed pigments or carbon black dispersion.

SUMMARY OF THE INVENTION

The foregoing and other needs are satisfied by the present invention, which, in one embodiment, employs an encapsulation method that does not require the presence of organic solvents. Further, the method does not require any chemical interaction of the components that encapsulate the particles (which may be magnetic particles, pigments, or carbon black), and indeed those encapsulation components that form a shell wall around the particles preferably do not chemically react at all. Another aspect of the method of the present invention is that the medium that is used to disperse the particles (which may be magnetic particles, pigments, or carbon black) for the purpose of encapsulating the same, actually forms the shell wall that encapsulates the particles, pigments or carbon black, fully consuming the dispersing medium as components of the shell wall.

The present invention includes a process of modifying the surface properties of particles (including magnetic particles, such as iron oxide pigments, pigments, or carbon black) to produce hydrophobic (or, in some instances, hydrophilic), encapsulated particles, such as magnetic particles, pigments or carbon black. Such encapsulated particles may be formulated to have high chemical affinity for various ink vehicles, such as lithographic ink vehicles. The encapsulated magnetic pigments of this invention are suitable for use in magnetic printing inks, as well as for other magnetic recording systems, such as audio and video tapes, magnetic storage disks, and other magnetic storage and readable systems.

The encapsulated pigments and carbon black may be used to form inks, such as those used in lithographic (direct and offset), letterpress, gravure, flexographic, silk-screen, and mimeograph printing processes, or to form radiation curable inks, such as infrared and ultraviolet curable inks.

The encapsulated pigments and carbon black also may be used as photoconductive particles, electrically conductive particles, hydrophobic/hydrophilic particles, toners to develop latent images, and colorants in coatings and paints.

In accordance with one aspect of the present invention, there is provided a coated particle (which may be a magnetic particle, pigment, or carbon black) having a particle diameter from about 0.1 to about 100 microns, typically from about 0.5 to about 5 microns, and having a coating on its surface, said coating comprising an ionomer. The coating may also comprise an oil, a thixotropic agent, and/or a binder resin.

A unique aspect of the present invention is the fact that the coating on the encapsulated particles most preferred is very firmly associated with the particle itself. This is due to the presence of an ionomer in the preferred encapsulating wall materials. The ionomer is critical to obtain the best functional properties for the inks.

Another unique aspect of the present invention is the ability to use soya oil in the encapsulating wall material. The soya oil is inexpensive, yet may be readily incorporated into the shell. The presence of the soya oil provides for excellent compatibility between the encapsulated particles and, for example, ink vehicles, such as those used in many printing processes. Further, the presence of the soya oil in the encapsulating wall specifically provides for the ability to incorporate soya oil into the ink vehicle, which results in a formulated ink product that is relatively inexpensive, but moreover, is ecologically more acceptable than ink formulations that contain a large amount of volatile organic solvent.

The inks of the present invention, when the ionomer is employed, have greatly improved properties over conventional inks. Even when no ionomer is employed in the encapsulating shell, inks made with the particles of the present invention still exhibit improved functional properties over conventional ink formulations.

The soya oil has excellent wetting characteristics for the pigment surface. However, the soya oil has an adverse effect on the drying time of the inks, the more soya oil content in the printing inks, the worse the drying time of that ink.

According to the current invention, the soya oil was modified by the incorporation of ionomers, polymers, resins, thixotropic agents and it is possible now to increase the soya content to high level (25% in some instances).

There is also provided a printing ink, such as a lithographic printing ink comprising a (lithographic) printing ink vehicle and from about 1 to about 99 percent, typically about 1 to about 90 percent, of encapsulated particles (which may be magnetic particles, pigments, or carbon black), based on the total weight of the ink, said ink being free of volatile organic solvents. Preferably, the vehicle contains a vegetable oil, such as soya oil, or a derivative thereof.

A method for encapsulating particles (which may be magnetic particles, pigments, or carbon black) is also provided. As indicated previously the present invention provides an encapsulation method that comprises dispersing the particles in a heated medium that comprises all of the components for forming a shell wall around the particles, without the presence of any volatile organic solvent, and cooling the dispersion to allow the components of the medium to solidify to form the shell wall to encapsulate the particles, fully consuming the dispersing medium as components of the shell wall, to form the desired encapsulated particles.

In a specific embodiment, the method comprises forming a melt comprising a polymer, an ionomer, and an oil and resinous material, dispersing said particles in said melt, and allowing said dispersion to cool, said melt being free of volatile organic solvents and said melt being present in an amount from about 10 to about 80 percent, based on the total weight of the encapsulated product. The melt may also comprise an oil, a thixotropic agent, and/or a binder resin.

In another embodiment, the melt will comprise an oil, such as a vegetable oil, preferably soya oil, and resinous material.

A composition for use in forming a magnetic recording medium is also provided, wherein the composition comprises a dispersion of encapsulated magnetic particles in a resinous carrier, said particles being encapsulated with a composition comprising an ionomer.

A magnetic recording medium comprising a nonmetallic support and a metallic layer formed thereon that is comprised of a composition comprising encapsulated magnetic particles and a resinous binder, wherein the magnetic particles have been encapsulated with a coating comprising an ionomer, is also provided.

DETAILED DESCRIPTION OF THE PREFERRED EMBODIMENTS

THE OIL

The oil may be any suitable hydrocarbon that will act as a good medium for the other shell wall components in their heated state. Preferably the oil is a vegetable oil, especially soya oil. Other suitable oils include linseed oil or any other vegetable oil (cotton seed, china wood, and the like). Common derivatives of such oils, such as wholly or partially hydrogenated oils or derivatives of such oil may be used. Both raw and treated (heat, alkali, acid, . . . etc.) oils are applicable to the current invention.

THE THIXOTROPIC AGENT

The thixotropic agent may be any agent, preferably a polymeric component, that is solid at 25° C. but will melt without degrading at a temperature of about 150° C., or lower. Preferably the thixotropic agent, will impart hydrophobicity to the pigment particles as well as thixotropic properties when the particles are used in a final magnetic offset printing inks. Most preferably the thixotropic agent is an oxidized polyethylene homopolymer. Other useful thixotropic agents include gellants and polyethylene gel.

Most preferably the thixotropic agent will have an acid value from about 6 to about 120 and will have the similar acid number as for the binder. Useful thixotropic agents include those available from Allied Signal under the trademarks A-C 316, 316A, 325, 330, 392, 395, 395A, 629, 629A, 655, 656, 680 and 6702, especially A-C 629A.

THE BINDER RESIN

The binder resin may be any agent, preferably a polymeric component, that is solid at 25° C. but will melt without degrading at a temperature of about 150° C., or lower. The binder resin is preferably a maleic modified rosin ester (trademark Beckacite 4503 resin from Arizona chemical company). Other useful binder resins include phenolics, maleics, modified phenolics, rosin ester, and modified rosin, phenotic modified ester resins, rosin modified hydrocarbon resins, hydrocarbon resins, terpene phenotic resins, terpene modified hydrocarbon resins, polyamide resins, tall oil rosins, rosin ester resins, polyterpene resins, hydrocarbon modified terpene resins, acrylic and acrylic modified resins and similar resins or rosin known to be used in printing inks, coatings and paints.

THE PIGMENTS

The pigments that are of use in the present invention include but are not limited to the following:

Metallized Azo Reds: Red 49:1 (Barium salt), Red 49:2 (Calcium salt), Red 63:1 (Calcium salt)

Toluidine reds:

Naphthol reds

Pyrazolones

Rhodamines

Quiacridones: Red B, Red Y, Magenta B, Magenta and violet

Phthalocyanine blues

Phthalocyanine greens

Carbazole violets

Monoarylide Yellow

Diarylide Yellow

Chrome yellow

Red Lack C

Lithol reds: calcium and barium salts

Lithol rubine

Bon Maroon

Perylene pigments

Red 2B: Calcium, Barium and Magnesium salts

Chrome Yellow

Chrome Orange

Molybdate orange

Orange 36, Diarylide orange, Dianisidine orange, tolyl orange and Dinitraniline orange Such pigments may have a wide range of particle sizes, as from about 0.1 μm to about 100 μm, preferably from about 0.2 μm to about 5 μm, and more preferably from 0.2 to 2 μm.

THE METAL PARTICLES

The magnetic metal particles of use in the present invention are usually iron oxide, such as cubic iron oxide, accicular iron oxide, gamma-$Fe_2O_3$, and mixed crystals of gamma-$Fe_2O_3$ and $Fe_3O_4$. The particles also may be, however, $Cr_2O_2$, gamma $Fe_2O_3$ or $Fe_3O_4$ coated with cobalt, barium ferrite, iron carbide, pure iron, and ferromagnetic alloy powders such as Fe-Co and Fe-Co-Ni alloys. The particle size should be from about 0.1 microns to about 100 microns, typically from about 0.2 to about 5 microns, preferably from about 0.2 to about 2 micron.

A preferred metal particle is Type 031182 magnetic pigment from Wright Industries, Inc., Brooklyn, N.Y. having a particle size of 0.7 microns.

THE IONOMERIC COMPONENT

As indicated, in a preferred aspect of the present invention, an ionomeric composition is employed. The ionomeric composition contains ionomers that have a melting point of at least about 70° C. The ionomers are critical to obtain the best functional properties of inks made with the encapsulated particles.

Typically, ionomers contain a certain number of inorganic salt groups attached to a polymer chain, such as up to 15 mol % ionic groups pendant to a base polymer, such as a hydrocarbon or perfluorinated polymer chain.

The pendant ionic groups interact to form ion-rich aggregates contained in a nonpolar polymer matrix. The resulting ionic interactions strongly influence polymer properties and application. The salt groups chemically combined with a nonpolar polymer backbone have a dramatic influence on polymer properties not observed with conventional homopolymers or with copolymers based on nonionic species. The ionic groups interact or associate to form ion-rich regions in the polymer matrix.

The ionic interactions and resultant polymer properties are dependent on the type of polymer backbone (plastic or elastomer); ionic functionality (ionic content), generally 0–15%; type of ionic moiety (carboxylate, sulfonate, or phosphonate); degree of neutralization (0–100%); and type of cation (amine, metal, monovalent, or multivalent).

An ionomer can be defined as a polymer composed of a polymeric backbone containing a small amount of pendant carboxylic acid sulfonate or phosphate groups, usually less than 15 mole percent, which are neutralized, partially or completely, to form an ionomer. Ionic hydrocarbon polymers for elastomers or plastics are disclosed in U.S. Pat. No. 3,264,272.

Ionomers may be prepared by copolymerization of a functionalized monomer with an olefinic unsaturated monomer or direct functionalization of a preformed polymer. Typically, carboxyl-containing ionomers are obtained by direct copolymerization of acrylic or methacrylic acid with ethylene, styrene, and similar comonomers by free-radical copolymerization. The resulting copolymer is generally available as the free acid, which can be neutralized to the degree desired with metal hydroxides, acetates, and similar salts.

Another route to ionomers involves modification of a preformed polymer. Sulfonation of polystyrene, for example, permits the preparation of sulfonated polystyrene (S-PS) with a content of sulfonic acid groups in proportion to the amount of sulfonating agent. Such reactions may be conducted in homogeneous solutions, permitting the direct neutralization of the acid functionality to the desired level. The neutralized ionomer may be isolated by conventional techniques, i.e., coagulation in a non-solvent, solvent flashing, etc.

Useful ionomers include:

| | |
|---|---|
| poly(ethylene-co-acrylic acid) | Aclyn ® |
| poly(ethylene-co-methacrylic acid) | Surlyn ® |
| poly(butadiene-co-acrylic acid) | Hycar ® |
| perfluorosulfonate ionomers | Nafion ® |
| perfluorocarboxylate ionomers | Flemion ® |
| telechelic polybutadiene | Hycar ® |
| sulfonated ethylene-propylene terpolymer | Ionic Elastomer ® |
| poly(styrene-co-acrylic acid) | |
| sulfonated polystyrene | |
| sulfonated cetyl elastomer | |
| sulfonated polypentenamer | |

Ionomers of use in the present invention may be made by first forming a functional polymer. Useful polymers include acrylic copolymers, polyester-acrylic graft copolymers, polyester polymers and urethane polymers.

Useful acrylic copolymers are carboxyl functional acrylic copolymers which can be produced by polymerizing monomers in bulk, in an organic solvent, or by other suitable processes to produce carboxylic functional polymer. The carboxylic acid functional acrylic copolymer comprises copolymerized ethylenically unsaturated monomers, including ionizable carboxyl monomers, to produce a copolymer containing reactive primary carboxylic acid groups and having a number average molecular weight between 500 and 100,000, and preferably between 1,000 and 40,000. Number average molecular weights are typically measured by GPC according to ASTM methods such as D3016-72; D3536-76; D3593-80; or D3016-78.

The acrylic copolymers have a Tg between 20° C. and 100° C. as calculated by the FOX equation based on the weight ratio of specific monomers. The Acid No. of the carboxylic acid functional polymer is between 10 and 200 and preferably is between 30 and 90. The copolymers can be produced by bulk, solvent, or suspension polymerization of ethylenically unsaturated monomers including carboxylic acid monomers, activated by peroxide or azo or other free radical initiator at polymerization temperatures typically between 40° C. to 170° C. and preferably between 70° C. to 150° C. Typically 0.2% to 5% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred. Other initiators include azo initiators such as azobisisobutyronitrile and persulfate or ammonium persulfates. Molecular weight control can be achieved by adjusting temperature, initiator level, or by the addition of chain transfer agents, such as the common mercaptans.

Typical solvents useful in preparing the organic solventborne acrylic copolymers can include for instance, xylene, toluene, ethyl acetate, acetone, methylisobutyl ketone, methyl n-amyl ketone, methylisoamyl ketone, ethylamyl ketone, amyl acetone, methylethyl ketone, ethyl alcohol, mineral spirits, ethylene glycol monoethyl ether acetate, and other aliphatic, cycloaliphatic and aromatic hydrocarbons, esters, ethers, ketones and alcohols. After the polymerization is completed, the solvents may be stripped off to produce a solid polymer for use in a powder coating.

Copolymerizable ethylenically unsaturated monomers useful in producing the carboxylic acid functional acrylic copolymer are monomers containing carbon-to-carbon, ethylenic unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyolopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

The carboxylic acid functional polymer comprises copolymerized monomers including at least 1% by weight ionizable carboxylic acid monomer which include acrylic and methacrylic acids as well as olefinic unsaturated acids. Acrylic acids include acrylic and methacrylic acid, ethacrylic acid, alpha-chloracrylic acids, alpha-cyanoacrylic acid, crotonic acid, and beta-acryloxy propionic acid. Olefinic unsaturated acids include fumaric acid, maleic acid or anhydride, itaconic acid, citraconic acid, mesaconic acid, muconic acid, glutaconic acid, aconitic acid, hydrosorbic acid, sorbic acid, alpha-chlorosorbic acid, cinnamic acid, and hydromuconic acid. On a weight basis, the carboxylic acid functional polymer contains at least 1% copolymerized carboxyl functional monomers and preferably between 5% and 15% carboxylic acid monomers.

Polyester polymers comprise the esterification products of glycols, diols, or polyols with excess equivalents of dicarboxylic acid or polycarboxylic acids. Linear aliphatic glycols are esterified with greater molar amounts of aromatic dicarboxylic acid and/or linear saturated dicarboxylic acid having between 2 and 36 linear carbon atoms such as adipic, azelaic, succinic, glutaric, pimelic, suberic or sebacic acid to produce low molecular weight polyesters. Commercially available linear saturated dicarboxylic acids are dodecanedioic acid, dimer fatty acids, or azelaic acid. Aromatic dicarboxylic acids (anhydrides) include phthalic, isophthalic, terephthalic, and tetrahydrophthalic. Minor amounts of polyfunctional acids such as trimelletic acids can be added. Suitable glycols include linear aliphatic glycols having 2 to 16 carbon atoms such as 1,3- or 1,4-butylene glycol, 1,6-hexane diol, neopentyl glycol, propylene glycol, ethylene glycol and diethylene glycol, propylene, and dipropylene glycol, and similar linear glycols, hydrogenated Bisphenol A. Minor amounts of polyols can be used such as glycerol, pentaerythritol, dipentaerythritol, or trimethylol ethane or propane. The molar deficiency of the glycol over the greater molar amounts of aromatic and linear saturated dicarboxylic acid is between about 1% and 50%. Hence, the polyester may contain an excess of unreacted carboxylic groups to provide a carboxyl polyester having an Acid No. between 5 and 300. The molecular weight of useful polyester polymers are between 500 and 50,000 and preferably between 1,000 and 10,000. Glycol can be esterified with minor amounts of up to about 20% by weight of unsaturated dicarboxylic acids (anhydrides) including maleic, fumaric or itaconic acids; or monocarboxylic acids such as acetic, benzoic, and higher chain aliphatic acids up to about 12 carbon atoms as well as aromatic acids. The polyester component can be produced by solvent or bulk polymerization although bulk polymerization is preferred. The raw materials can be charged in bulk and esterification polymerized at temperatures typically between 170° C. to 240° C. although moderately higher or lower temperatures can be utilized satisfactorily. Azeotropic removal of water with a suitable solvent, such as xylene, often helps to reduce processing times. An esterification catalyst can be used, typically at less than 1% levels based on charge, such as an organic tin compound.

Grafted copolymers of polyester and acrylics can be produced by free-radical polymerization of ethylenically unsaturated monomers, including acrylic and carboxyl monomers, in the presence of a preformed molten or fluid polyester at temperatures sufficient to induce addition copolymerization of the monomers along with some grafting onto the polyester backbone. Organic solvents are not required, but can be added if desired to provide desired viscosity in solvent coatings. On a weight basis, the polyester-acrylic graft polymer may contain between 5% and 90% polyester polymer component with the balance being the acrylic polymer component. The polyester component of the polyester acrylic graft polymer is a moderate molecular weight polymer having a number average molecular weight between about 500 and 50,000 and preferably between 1,000 and 5,000. The polyester polymer should have an Acid No. above about 5, preferably between 20 and 100, and can be prepared as previously described.

The acrylic polymer component of the polyester-acrylic graft polymer comprises in-situ copolymerized ethylenically unsaturated monomers, including acrylic monomers and carboxyl monomers, along with other ethylenically unsaturated monomers if desired. Acrylic monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloracrylic acid, alpha-cyanoacrylic acid crotonic acid, beta-acryloxy propionic acid, and beta-styrl acrylic acid. Other ethylenically unsaturated monomers have been previously described herein. The copolymerized monomers for the acrylic component of the polyester-acrylic graft polymer comprises copolymerized monomers, on a weight basis between 1% and 100 of acrylic monomer, between 0% and 30% acrylic or methacrylic carboxylic acid monomer, with the balance being other ethylenically unsaturated monomers. Preferred acrylic components comprise between 20% and 90% acrylic monomer, between 5% and 15% carboxyl acid monomer, with the balance being other ethylenically unsaturated monomers. It should be noted that the carboxyl functionality can be part of the polyester polymer or part of the grafted acrylic polymer or on both polymers. The Acid No. of the polyester-acrylic graft polymer is preferably between about 20 and 100. The polyester-acrylic graft polymer preferably comprises by weight between 5% and 90% polyester polymer component and between 10% and 95% acrylic polymer component. The number average molecular weight of the polyester-acrylic graft polymer is between about 2,000 and 100,000 while preferred molecular weights are between 5,000 and 50,000 as measured by GPC. GPC chromatograms of the polyester and the grafted polyester-acrylic indicated that good grafting efficiency can be obtained.

Urethane ionomers can be produced with terminal carboxyl groups as well as terminal blocks, which can be crosslinked by zinc organic salts upon heating in accordance with this invention.

Carboxyl functional urethanes can be produced by coreacting diisocyanates with a diol or a polyol and a hydroxyl acid. Linear polyurethanes are obtained from difunctional reactants while branched polyurethanes are produced from the combination of difunctional and higher functional reactants. Urethanes can be prepared from any of several available aromatic, aliphatic, and cycloaliphatic diisocyanates and polyisocyanates. Suitable polyisocyanates can be di- or triisocyanates such as, for example, 2,4- and 2,6-tolylene diisocyanates, phenylene diisocyanate; hexamethylene or tetramethylene diisocyanates, 1,5-naphthalene diisocyanate ethylene or propylene diisocyanates. Trimethylene or triphenyl or triphenylsulfone triisocyanate, and similar di- or triisocyanates or mixtures thereof. The polyisocyanate can be generally selected from the group of aliphatic, cycloaliphatic and aromatic polyisocyanates such as for example hexamethylene 1,6-diisocyanate, isophorone diisocyanate, diisocyanate, 1,4-dimethyl cyclohexane, diphenylmethane diisocyanate 2,4-toluene diisocyanate, 2,6-toluene diisocyanate and mixtures thereof, polymethylene polyphenyl polyisocyanate, or isocyanate functional prepolymers.

A wide variety of diols and polyols can be used to prepare urethanes with a wide range of properties. Polyethers, such as the polytetramethylene oxides can be used to impart flexibility as well as the polyethylene oxides and polypropylene oxides. Simple diols that can be used include neopentyl glycol, 1,6-hexane diol, and longer chain diols having 12, 14 and higher carbon chains. Branching can be introduced with polyols such as trimethylol propane and pentaerythritol. Hydroxyl functional polyesters and various other hydroxyl functional polymers are also suitable. Useful polyols preferably contain two, three, or four hydroxyl groups for coreaction with the free isocyanate groups. Useful polyols are: -diols such as ethylene glycol, propylene glycols, butylene glycols, neopentyl glycol, 14-cyclohexane dimethanol, hydrogenated bisphenol A, etc.; triols such as glycerol, trimethylol propane, trimethylol ethane; tetrols such as pentaerythritol; hexols such as sorbitol, dipentaerythritol, etc.; polyether polyols produced by the addition of alkylene oxides to polyols; polycaprolactone polyols produced by the addition of monomeric lactones to polyols, such as caprolactone; and hydroxyl terminated polyesters.

The polyurethane also contains a coreacted hydroxy-acid material. The hydroxy-acid contains at least one reactive hydroxy group for coreacting with the isocyanate during polymer synthesis and at least one carboxy group which is essentially non-reactive to the isocyanate groups during the polymer synthesis. Examples of alkyl acids are 2,2-dihydroxymethyl propionic acid, 2,2-dihydroxymethyl butyric acid, glycolic acid, and the like; other acids are lactic acid, 12-hydroxy stearic acid, the product of the Dieis-Alder addition of sorbic acid to di-(2-hydroxyethyl) maleate or fumarate, or low molecular weight (300 to 600) precondensates of polyols with tribasic acids such as trimelletic anhydride or Ricinoleic acid. Acid functionality can be introduced with materials like 12-hydroxystearate, dimethylolpropionic acid, and various other hydroxy acids as well as carboxylated polyesters such as the Niax PWB-1200 (Union Carbide). Monohydroxyl acids will place the acid functionality at the end of the chain, while the diol acids will randomly place the acid groups in the chain. When isocyanates are reacted with diols and polyols of various types, the reaction rate may be enhanced by the use of catalysts. Common isocyanate catalysts are suitable and examples include dibutyltindilaurate, dibutyltinoxide, and the like.

The number average molecular weight of the urethane can be between 500 and 100,000 and preferably between 5,000 and 50,000 as measured by GPC.

In accordance with this invention, the useful level of neutralization of the carboxylic acid functional copolymer, is above 10% and preferably between 30% and 200% and most preferably between 50% and 150% neutralization. Neutralization with a basic sodium composition, such as sodium hydroxide, is preferred, so that the ionomer contains sodium ions as the cationic component.

Useful ionomers include those available under the trademarks ACLYN 260 to 286 and 260A to 286A, which are ethyleneacrylic and sodium ionomers, with molecular weights of over 1200. These ionomers are available with Ca, Mg, Na, and Zn cations. Especially preferred is ACLYN 276A.

THE INKS

The encapsulated pigment may be added to an ink vehicle, such as a vehicle typically used for lithographic (direct and offset), letterpress, gravure, flexographic, silk-screen, or mimeograph printing processes, or vehicles used to form curable inks, such as infrared and ultraviolet curable inks, to form a printing ink. Generally the encapsulated pigments will be present in an amount from about 1 to about 90 percent, preferably from about 40 to about 85, and most preferably from about 50 to about 80 percent, based on the total weight of the ink. Any suitable ink vehicle may be used. The full advantage of the present ink formulations is achieved only if the vehicle is substantially free of volatile organic solvent. As used herein the term volatile organic solvent is meant to indicate such solvents that are vapors at temperatures above about 120° C. Preferably, the ink vehicle will include one or more vegetable oils, as defined previously, especially a soya oil.

One ink vehicle that is preferred is a vehicle made from 16-V-10 varnish (Sun Chemical), varnish #4895 (100% solid varnish made from hydrocarbon resin, Superior Varnish), varnish #6948 (100% solid soya gel varnish, Superior Varnish Co.). The mixture may be allowed to mix, as by using a SCHOLD mixer, for mixing time from about 1 to about 4, preferably from about 1 to about 2 hours. Such inks exhibit excellent transfer, very fast drying, high signal strength at thinner ink film, long run stability without emission of any hazardous solvent, and produce high quality prints.

THE ENCAPSULATION METHOD

According to the present invention the encapsulated particles are prepared by dispersing particles of the specified size, such as a magnetic powder, preferably untreated, hydrophilic cubic iron oxide (black magnetic ink pigment trade code 031181 from Wright Industries Inc.) into preheated shell wall former materials, as by the aid of a SCHOLD mixer. The shell wall material preferably contains an oil, preferably a soybean oil (Kerely Ink), a binder resin, preferably a maleic modified rosin ester (trademark Beckacite 4503 resin from Arizona chemical company), a thixotropic agent, preferably an oxidized homopolymer polyethylene gel (AC629A polyethylene from Allied-Signal Inc.) and an ionomer, preferably an ethylene acrylic acid ionomer, preferably sodium ionomer (trademark Aclyn A 276 from Allied signal).

The shell wall materials are heated to a temperature just above their softening point (i.e. 140°–150° C.). The heating is accompanied with constant mixing until all the ingredients are melted and dissolved in the carrier, such as soybean oil. At this stage the particles, such as iron oxide pigment, i.e. the capsules core materials, are added portion-wise to the hot shell wall materials while maintaining the constant stirring. After the completion of the addition of the particles, the mixture is allowed to be mixed until a homogeneous, uniform dispersion of the iron oxide pigments in the host hot shell wall forming materials is achieved. Finally the mixture is allowed to cool to the room temperature. Upon cooling the system, the shell wall materials solidify and encapsulate the particles with a (hydrophobic) shell. A toning blue pigment, such as an alkali blue may be added to the particles, such as iron oxide core materials, to improve the color of the printed ink, when the encapsulated particles are used as a printing ink.

Similar method was used to encapsulate colorants and carbon black.

The weight percentage compositions of the encapsulated particles are generally in the following ranges:

| | |
|---|---|
| Oil | from 10 to 90 |
| Preferably | from 5 to 75 |
| Most Preferably | from 10 to 55 |
| Resins | from 0 to 50 |
| Preferably | from 1 to 35 |
| Most Preferably | from 2 to 20 |
| Thixotropic Agent | from 0 to 25 |
| Preferably | from 0.1 to 15 |
| Most Preferably | from 0.2 to 10 |
| Ionomer | from 0 to 20 |
| Preferably | from 0.1 to 15 |
| Most Preferably | from 0.1 to 10 |
| Core Materials | from 1 to 90 |
| Preferably | from 5 to 85 |
| Most Preferably | from 10 to 80 |

| | |
|---|---|
| Dye | from 0 to 15 |
| Preferably | from 0.5 to 10 |
| Most Preferably | from 1 to 6 |
| NB | |

These ranges are for magnetic, pigments, and carbon blacks. Typically, then, the coating will comprise from about 10 to about 80 percent of the coated particle. All of the foregoing percentages are by weight, based on the total weight of the encapsulated magnetic particle.

MAGNETIC RECORDING MEDIA

It is typical for magnetic recording media, such as tapes and discs, to be made by applying a magnetic coating to a substrate, typically a polymeric substrate, and most typically a polyethylene terephthalic film. The magnetic particles of the present invention may be applied to a suitable substrate to form a magnetic recording medium by manners well known in the art. For example, the particles may be dispersed in a suitable binder, such as vinyl chloride/vinyl acetate copolymers, vinyl chloride/vinyl acetate/vinyl alcohol polymers, vinyl chloride/vinylidene chloride copolymers, polyurethane resins, polyester resins, acrylonitrile/butadiene copolymers, nitrocellulose, cellulose acetate butyrate, epoxy resins, and acrylic resins.

Thus, the present invention provides a magnetic recording medium comprising a nonmetallic support and a metallic layer formed thereon that is made of a composition comprising magnetic particles and a resinous binder, wherein the magnetic particles have been encapsulated in accordance with the present invention.

The magnetic recording media made in accordance with the present invention may exhibit extremely good signal to noise characteristics. This should be achievable in view of the fact that the encapsulated magnetic particles of the present invention are very uniform in size and properties, and can be deposited in an extremely uniform manner onto a substrate, without agglomeration of the particles. The resulting coating should be very smooth and abrasion resistant, giving rise to long useful lives for the recording media.

GENERAL

The advantages of the current invention over the prior art include:

1. The inks, including magnetic inks, made according to the current invention show excellent functional properties as compared with those made of identical pigments which have not been treated. Inks made according to the current invention show the following improvements, over the prior art magnetic inks: fast ink drying, excellent transfer on the press, high signal strength at thinner ink film, open on the press, excellent signal stability, excellent press stability, and excellent shelf life.

2. The fast drying properties of the ink allow the printer to convert the printed materials into final products immediately after printing, which cannot be achieved with prior art compositions, even with those containing auxiliary driers. Higher throughput can therefore be achieved with the current invention.

3. The fast drying property of the ink made according to the current invention was achieved without the use of the auxiliary driers. This helps to keep the ink open on the press for a very long period of time.

4. The fast drying may be achieved in air and without any external energy source such as heat, UV radiation, or IR radiation.

5. The ink is environmentally safe. No undesirable solvents or volatile vapors are emitted during its application.

6. Manufacture of the encapsulated particles, such as magnetic pigments, of the current invention does not contribute to air pollution, as no volatile solvents are used during the manufacturing process.

7. The magnetic inks produce according to the current invention exhibit very high signal strength, even with thin ink films, as compared with those of the prior art.

8. The high signal strength is achieved by enhancing the chemical affinity between the encapsulated magnetic pigments and the binder system.

9. The encapsulated particles are found to disperse very easily in the binder system, to produce an agglomeration-free magnetic dispersion.

10. The current invention produces uniform, agglomeration-free encapsulated particles. Hence, when magnetic particles are encapsulated, stronger signal strength at thinner film, with superior press performances, as compared to prior art of treated or untreated magnetic pigments are achieved.

11. The encapsulated particles, such as colored pigments and magnetic particles, are chemically compatible with ink vehicles, such as lithographic and letter press ink vehicles. The need for the expensive and time consuming three roll mill during manufacturing the magnetic inks are eliminated. A simple mixing process is sufficient to produce an ink with zero fines of grind.

12. The final products of the encapsulated particles are 100% solid. No hydrocarbon solvent, or external liquids are used as a carrier liquid during the encapsulation process.

13. The capsules constitute 100% of the encapsulating system.

14. The hot shell wall materials act as a carrier for the encapsulation as well as a wall former materials.

15. The encapsulation process imparts the necessary hydrophobic properties to the particles, such as magnetic particles. This is an important property for offset printing inks to achieve a proper ink water balance and to prevent ink emulsification during printing on presses equipped with either an integrated or segregated dampening system.

16. The core material may constitute up to 90%, by weight, of the total weight of the capsules.

17. The surfaces of the particles, such as iron oxide, and the shell wall materials are chemically compatible. Hence, the surface of the particles are efficiently wetted with the hot shell wall materials. This significantly enhances the pigment dispersion in the carrier medium and prevents pigment agglomerations.

18. Simple mechanical mixing produces a very uniform dispersion of particles, such as iron oxide, in the host shell wall materials.

19. The shell wall materials may constitute soybean oil, maleic modified rosin ester, polyethylene gellant and sodium ionomer.

20. The hot shell wall materials, when cooled, quickly solidify and encapsulate the highly dispersed particles. The shell wall, especially when ionomers are present, adheres strongly to the surface of the particles and becomes indistinguishable parts of it.

21. The shell wall adheres strongly on the surfaces of the iron oxide pigments.

22. The ionomers (especially the sodium ionomer) enhance pigment dispersion in the hot shell wall materials, promote the adhesion of the shell wall materials on the surfaces of the magnetic particles, control viscosity and control the hydrophobic/hydrophilic characteristic of the finished inks, and promote the adhesion of the finished ink on the substrate.

23. The gellants (especially the oxidized polyethylene homopolymer) impart hydrophobicity for the pigment particles as well as thixotropic properties to the final magnetic offset printing inks.

24. The maleic modified rosin ester promotes the chemical affinity between the encapsulated magnetic pigments and the host printing ink vehicles, and enhances ink setting and drying properties of the inks.

25. The encapsulated carbon black and colored pigments according to the current invention are much safer and easier to handle than the prior art's pigments and carbon black.

26. The current invention eliminates the hazardous dusting problems during weighing or packaging of the magnetic particles, pigments and carbon blacks.

27. The high pigment to ink vehicle ratio is achieved according to the current invention, without affecting the excellent press performance of the ink.

28. The encapsulated magnetic pigment according to the current invention may contain cubic iron oxide or accicular iron oxide pigments.

The present invention also provides a means for making inks by encapsulating the desired pigment or carbon black in accordance with the present invention, then dispersing the encapsulated pigment or carbon black in the desired vehicle. The vehicle may be one suitable for lithographic, letterpress, gravure, or flexographic printing, or for use as a radiation curable ink. By use of the encapsulated pigments and carbon blacks of the present invention, particle agglomeration is effectively eliminated.

Because the encapsulated pigment or carbon black has a strong affinity for the ink vehicles (varnishes), the encapsulated particles are easily dispersed into the desired vehicle, to form agglomerate-free printing inks. Because of the high affinity of the encapsulated particles with respect to the ink vehicles, it is possible to achieve very high pigment loadings, such as up to 90 percent, by weight. Such is in sharp contrast to the flushing process of the prior art in which a presscake of colorants is dispersed in an oleoresinous binder, using a mechanical aid, such as a three roll mill. The process requires the complicated use of hydrocarbon solvents, grinding vehicles, surfactants, and varnishes. Auxiliary driers and/or energy is often required, depending upon the flush and ink vehicles. The resultant compositions is very viscous and difficult to handle, even though the pigment loading is relatively low, usually not above 50 to 55 percent. All such problems are eliminated by use of the present invention.

The invention will be further illustrated in terms of the following nonlimiting examples.

EXAMPLES

The general method utilized to prepare the encapsulated particles is described below:

According to the present invention the encapsulated particles are prepared by dispersing the untreated, particles, such as hydrophilic cubic iron oxide (black magnetic ink pigment trade code 031182 from Wright Industries Inc.) into preheated shell wall former materials, as by the aid of a SCHOLD mixer. The shell wall material contains soybean oil (Kerely Ink), a maleic modified rosin ester (trademark Beckacite 4503 resin from Arizona chemical company), an oxidized homopolymer polyethylene gel (AC629A polyethylene from Allied-Signal Inc.) and ethylene acrylic acid ionomer, preferably sodium ionomer (trademark Aclyn A 276 from Allied signal). The shell wall materials is heated at temperature just above their softening point (i.e. 140°–150° C.). The heating is accompanied with constant mixing until all the ingredients are melted and dissolved in the carrier soybean oil. At this stage the pigment, such as magnetic iron oxide pigment, i.e. the capsules core materials, is added portion-wise to the hot shell wall materials while maintaining the constant stirring. After the completion of the addition of the iron oxide pigment, the mixture is allowed to be mixed until a homogeneous, uniform dispersion of the iron oxide pigments in the host hot shell wall forming materials is achieved. Finally the mixture is allowed to cool to the room temperature. Upon cooling the system, the shell wall materials solidify and encapsulate the particles, such as magnetic powders, with a hydrophobic shell. An alkali blue may be added to the iron oxide core materials to improve the color of the printed ink.

The percentage compositions of the encapsulated iron oxide pigment were as follows in Example I:

| Soybean Oil | 13.4% |
| --- | --- |
| Beckacite XR4503 resin | 4.0% |
| AC 629A polyethylene | 2.5% |
| Aclyn 276A | 1.0% |
| Iron Oxide pigment | 80.0 |
| Alkaline Blue pigment | 1.5% |

Other compositions were similarly prepared in the same general manner with the components as shown in Table I.

The encapsulated pigment prepared as mentioned above was then incorporated in the ink vehicle to produce printing inks, such as magnetic printing inks. An example of making the magnetic printing ink is described below:

The encapsulated pigment, from the above example, is added to a lithographic ink vehicle in the proportion stated below: The ink vehicle was made from 16-V-10 varnish (Sun Chemical), varnish #4895 (100% solid varnish made from hydrocarbon resin, Superior Varnish), varnish #5848 (100% solid soya gel varnish, Superior Varnish Co.). The mixture was then allowed to mix using a SCHOLD mixer for 2 hours. The resultant lithographic offset magnetic inks exhibit an excellent transfer, very fast drying, high signal strength at thinner ink film, good adhesion and excellent print quality, long run stability without emission of any hazardous solvent.

The percentage composition of the offset magnetic ink are:

| Encapsulated iron oxide pigment | 77.5% |
| --- | --- |
| 16-V-10 Varnish | 12.5% |

-continued

| | |
|---|---|
| Varnish #4895 | 5.0% |
| Varnish #5848 | 5.0% |

Several other formulations of the magnetic ink composition and comparative compositions were made in the same general manner (Examples 2–11) and are listed in Table I, along with the results of their evaluation in standard lithographic printing, as shown in Table II, (Examples 12–34). The invention is not limited to this particular range of tack and viscosity. By modifying the percentage and the composition of the shell wall materials, as well as the percentage and the composition of the ink vehicle. Inks with very wide range of tack and viscosity, can be produced, which can fit all existing printing technologies (impact as well as non-impact). It is desired that the inks exhibit a viscosity from about 200 to about 500, preferably from 300 to 500 poises at 25° C. a tack of about 10 to about 35, preferably from 11 to 25, and a fineness of grind ("FOG") of 0. Signal strength should be high at the lowest possible ratchet setting, the higher ratchet setting being an indication of the need to deposit more ink onto the ink rollers and accordingly on the substrate. The encapsulated particles of Examples 2 and 4 are used in the inks of Examples 12–14 and the inks of Example 15, respectively. These particles do not contain an ionomer and thus perform less satisfactory than the particles containing the ionomer. However, such particles are still preferred over conventional particles.

In Table III, Examples 35 and 36, there is shown the production of encapsulated pigments in accordance with the present invention in which the shell wall material uses a soya oil component to encapsulate colored pigments.

In Table IV, Example 37, there is shown the production of a printing ink that incorporates the encapsulated pigments made in accordance with the Example 35, in a carrier vehicle that incorporates a soya oil component.

In Table V, Examples 38–45, there is shown the production of encapsulated carbon black in accordance with the present invention in which the shell wall material uses a soya oil component to encapsulate colored pigments. Examples 39–41 and 43–45 also employ an ionomer in the shell wall. The encapsulated carbon black made with the use of ionomers is preferred to obtain the optimum functional properties in the inks made therewith. The inks made with use of encapsulated pigments that do not contain ionomers (Examples 38 and 42—encapsulated pigments; Examples 46–47 and 60—inks) are still preferred over conentional inks.

In Table VI, Example 46–60, there is shown the production of printing inks that incorporate the encapsulated carbon blacks of Examples 38–45 in carrier vehicles that incorporate soya oil components.

TABLE I

| Ingredients | % |
|---|---|
| Example 2 | |
| Soybean Oil (Kerely) | 13.50 |
| Maleic modified rosin ester (Becacite XR 4503 - Arizona Chemical Co.) | 4.30 |
| PE 629A - oxidized polyethylene homopolymer (AC 629 - Allied Signal) | 1.00 |
| Iron Oxide - black magnetic ink pigment (031182 - Wright Industries) | 81.20 |
| Example 3 | |
| Soybean Oil (Kerely) | 21.80 |
| (Becacite XR 4503 - Arizona Chemical Co.) | 6.90 |
| PE 629A - oxidized polyethylene homopolymer - Allied Signal | 5.00 |
| Magnox 353 (accicular iron oxide - Magnox Co.) | 66.30 |
| Example 4 | |
| Soybean Oil (Kerely) | 14.50 |
| AC 629A - oxidized polyethylene homopolymer - Allied Signal | 4.00 |
| Iron Oxide (031182 - Wright Industries) | 81.50 |
| Example 5 | |
| Soybean Oil (Kerely) | 13.50 |
| (Becacite XR 4503 - Arizona Chemical Co.) | 4.20 |
| AC629A - oxidized polyethylene homopolymer - Allied Signal | 1.00 |
| AClyn 201 (calcium ionomer - Allied Signal) | 0.30 |
| Iron Oxide (pigment 031182 - Wright Industries) | 81.00 |
| Example 6 | |
| Soybean Oil (Kerely) | 13.50 |
| (Becatite XR 4503 - Arizona Chemical Co.) | 4.20 |
| AC 629A - oxidized polyethylene homopolymer - Allied Signal | 0.85 |
| AClyn 276A (sodium ionomer - Allied Signal) | 0.15 |
| Iron Oxide (pigment 031182 - Wright Industries) | 81.30 |
| Example 7 | |
| Soybean Oil (Kerely) | 13.30 |
| (Becatite XR 4503 - Arizona Chemical Co.) | 4.20 |
| AC 629A - oxidized polyethylene homopolymer - Allied Signal | 0.83 |
| AClyn A 276 (sodium ionomer - Allied Signal) | 0.17 |
| Iron Oxide (pigment 031182 - Wright Industries) | 81.50 |
| Example 8 | |
| Soybean Oil (Kerely) | 13.34 |
| (Becatite XR 4503 - Arizona Chemical Co.) | 4.00 |
| AC 629A - oxidized polyethylene homopolymer - Allied Signal | 0.83 |
| AClyn A 276 (sodium ionomer - Allied Signal) | 0.33 |
| Alkali Blue Pigment NB S6255D (BASF) | 1.50 |
| Iron Oxide (pigment 031182 - Wright Industries) | 80.00 |
| Example 9 | |

TABLE I-continued

| Ingredients | % |
|---|---|
| Soybean Oil (Kerely) | 13.34 |
| (Becatite XR 4503 - Arizona Chemical Co.) | 4.00 |
| AC 629A - oxidized polyethylene homopolymer - Allied Signal | 0.80 |
| Aclyn 285A (sodium ionomer - Allied Signal) | 0.17 |
| AClyn 276A (sodium ionomer - Allied Signal) | 0.17 |
| Alkali Blue pigment - NB 56255D - BASF | 1.50 |
| Iron Oxide pigment 031182 - Wright Industries | 80.00 |
| Example 10 (identical to Example 8) | |
| Soybean Oil (Kerely) | 13.33 |
| (Becatite XR 4503 - Arizona Chemical Co.) | 4.00 |
| AC 629A - oxidized polyethylene homopolymer - Allied Signal | 0.84 |
| AClyn 276A (sodium ionomer - Allied Signal) | 0.33 |
| Alkali Blue pigment - NB 56255D - BASF | 1.50 |
| Iron Oxide (pigment 031182 - Wright Industries) | 80.00 |
| Example 11 (identical to Example 8) | |
| Soybean Oil (Kerely) | 13.33 |
| (Becatite XR 4503 - Arizona Chemical Co.) | 4.00 |
| AC 629A - oxidized polyethylene homopolymer - Allied Signal | 0.84 |
| AClyn 276A (sodium ionomer - Allied Signal) | 0.33 |
| Alkali Blue pigment - NB 56255D - BASF | 1.50 |
| Iron Oxide (pigment 031182 - Wright Industries), | 80.00 |

TABLE II

| Ink Ingredients | % Comp. | Ink's Physicals | Press Evaluation |
|---|---|---|---|
| Example 12 | | | |
| Pigment (Ex. 2) | 68.00 | Tack = 20.8 | Passed |
| 16-V-101 | 20.00 | Vis = 468 | Water log test |
| Soy #6727[2] | 10.00 | FOG = 0 | (10,000 copies) |
| Alkali Blues[3] | 2.0 | | Passed |
| Example 13 | | | |
| Pigment (Ex. 2) | 68.00 | Tack = 18.4 | Water Log (10000) = |
| Soy Extender | 8.00 | Vis = 362 | Passed |
| 16-V-10[1] | 15.00 | FOG = 0 | |
| Soy #6727[2] | 7.00 | | |
| Alkali Blue[3] | 2.00 | | |
| Example 14 | | | |
| Pigment (Ex. 2) | 75.00 | Tack = 22.8 | Water Log (10000) = |
| 16-V-10[1] | 18.00 | Vis = 436 | Passed |
| Soy #6727[2] | 7.00 | FOG = 0 | Aquamatic Setting = 17 |
| Clayton AF[4] | 0.50 | | Ratchet Setting = 3 |
| | | | Signal Strength = 99%–109% |
| Example 15 | | | |
| Pigment (Ex. 4) | 75.00 | Tack = 23.4 | Water Log (10000) = |

TABLE II-continued

| Ink Ingredients | % Comp. | Ink's Physicals | Press Evaluation |
|---|---|---|---|
| 16-V-10[1] | 18.00 | Vis = 501 | Passed |
| Soy #6727[2] | 7.0 | FOG = 0 | Aqua Setting = 20 |
| | | | Ratchet Setting = 4 |
| | | | Signal Strength = 96%–77% |
| Example 16 | | | |
| Pigment (Ex. 6) | 75.00 | Tack = 16.7 | Water Log (10000) = |
| 16-V-10[1] | 12.50 | Vis = 402 | Passed |
| 6848[6] | 7.50 | FOG = 0 | Ratchet Setting = 2 |
| 6849[7] | | | Aquamatic Setting = 20 |
| | | | Signal Strength = 105–106 |
| Example 17 | | | |
| Pigment (Ex. 6) | 75.00 | Tack = 18.6 | Water Log (10000) = |
| 16-V-10[1] | 15.00 | Vis = 319 | Passed |
| Soy Disp #6727 | 10.00 | FOG = 0 | Ratchet Setting = 2 |
| | | | Aqua Setting = 20 |
| | | | Signal Strength = 105–106 |
| Example 18 | | | |
| Pigment (Ex. 6) | 75.00 | Tack = 17.5 | Water Log (10000) = |
| SVD 2023[8] | 15.00 | Vis = 412 | Passed |
| 6848[7] | 5.00 | FOG = 0 | Ratchet Setting = 2 |
| 6849[7] | 5.00 | | Aquamatic Setting = 18 |
| Soy Oil (Kerely) | 1.00 | | Signal Strength = 106–96 |
| Example 19 | | | |
| Pigment (Ex. 6) | 77.50 | Tack = 14.7 | Water Log (10000) = |
| 16-V-10[1] | 10.00 | Vis = 460 | Passed |
| 6848[6] | 7.50 | FOG = 0 | Ratchet Setting = 2 |
| 6849[7] | 5.00 | | Aquamatic Setting = 17 |
| | | | Signal Strength = 107–148 |
| Example 20 | | | |
| Pigment (Ex. 6) | 77.50 | Tack = 19.8 | Water Log (10000) = |
| 16-V-10[1] | 10.00 | Vis = 415 | Passed |
| Soy Disp #6727[2] | 7.50 | FOG = 0 | Ratchet Setting = 2 |
| | | | Aqua Setting = 17 |
| | | | Signal Strength = 97–101 |
| Example 21 | | | |
| Pigment (Ex. 7) | 77.50 | Tack = 18 | Water Log (10000) = |
| 16-V-10[1] | 10.00 | Vis = 483 | Passed |
| 6848[6] | 5.00 | FOG = 0 | Ratchet Setting = 2 |
| 6849[7] | 5.00 | | Aquamatic Setting = 23 |
| | 2.50 | | Signal Strength = 108–117 |
| Example 22 | | | |
| Pigment (Ex. 7) | 77.50 | Tack = 19.1 | Water Log (10000) = |
| 16-V-10[1] | 10.00 | Vis = 343 | Passed |
| 4895[10] | 5.00 | FOG = 0 | Ratchet Setting = 2–1 |
| Soy Disp #6727[2] | 5.00 | | Aquamatic Setting = 23 |
| Alkali Blue[9] | 2.50 | | Signal Strength = 105%–110% |
| Example 23 | | | |
| Pigment (Ex. 7) | 77.50 | Tack = 17.0 | Water Log (10000) = |
| 16-V-10[1] | 10.00 | Vis = 496 | Passed |
| 6848[6] | 5.00 | FOG = 0 | |
| 6849[7] | 5.00 | | |
| Alkali Blue[9] | 2.50 | | |
| Example 24 | | | |
| Pigment (Ex. 7) | 77.50 | Tack = 17.1 | Water Log (10000) = |
| SVD 2023[8] | 12.50 | Vis = 409 | Passed |
| 4895[10] | 2.50 | FOG = 0 | Ratchet Setting = 2.1 |
| 6848[6] | 5.00 | | Aquamatic Setting = 23 |
| Alkali Blue[9] | 2.50 | | Signal Strength = |

TABLE II-continued

| Ink Ingredients | % Comp. | Ink's Physicals | Press Evaluation |
|---|---|---|---|
| Example 25 | | | 105%–108% |
| Pigment (Ex. 7) | 75.00 | Tack = 15.4 | Water Log (10000) = Passed |
| Ultrex 47[12] | 12.50 | Vis = 357 | |
| Ultrex 49[13] | 10.00 | FOG = 0 | Ratchet Setting = 2–1 |
| Alkali Blue[11] | 2.50 | | (mega = 3–2) |
| | | | Aquamatic Setting = 17–19 (mega 25–29) |
| | | | Signal Strength = 105/112%–100/109% |
| Example 26 | | | |
| Pigment (Ex. 8) | 80.00 | Tack = 13.7 | Water Log (10000) = Passed |
| Ultrex 47[12] | 10.00 | Vis = 367 | |
| Ultrex 49[13] | 10.00 | FOG = 1 | Aqua Setting = 20 |
| | | | Signal Strength = 105%–111% |
| Example 27 | | | |
| Pigment (Ex. 7) | 77.50 | Tack = 16.6 | Water Log (10000) = Passed |
| SVD 2023[8] | 10.00 | Vis = 466 | |
| 6848[6] | 5.00 | FOG = 0 | |
| 6849[7] | 5.00 | | |
| Alkali Blue[11] | 2.50 | | |
| Example 28 | | | |
| Pigment (Ex. 7) | 77.50 | Tack = 12 | Water Log (10000) = Passed |
| 6848[6] | 5.00 | Vis = 318 | |
| 6849[7] | 5.00 | FOG = 0 | |
| Alkali Blue | 2.50 | | |
| Example 29 | | | |
| Pigment (Ex. 8) | 80.00 | Tack = 15 | Water Log (10000) = Passed |
| 16-V-10[1] | 10.00 | Vis = 406 | |
| 6848[6] | 5.00 | FOG = 0 | |
| 6849[7] | 5.00 | | |
| Example 30 | | | |
| Pigment (Ex. 7) | 77.50 | Tack = 14.7 | Water Log (10000) = Passed |
| 16-V-10[1] | 10.00 | Vis = 366 | |
| 6848[6] | 5.00 | FOG = 0 | |
| 6849[7] | 5.00 | | |
| Alkali Blue[11] | 2.50 | | |
| Example 31 | | | |
| Pigment (Ex. 8) | 80.00 | Tack = 14.7 | Water Log (10000) = Passed |
| Ultrex 47[12] | 15.00 | Vis = 366 | |
| Ultrex 49[13] | 5.00 | FOG = 0 | |
| Example 32 | | | |
| Pigment (Ex. 9) | 80.00 | Tack = 15.3 | Water Log (10000) = Passed |
| Ultrex 47[12] | 15.00 | Vis = 395 | |
| Ultrex 49[13] | 5.00 | FOG = 0 | |
| Example 33 | | | |
| Pigment (Ex. 9) | 80.00 | Tack = 16.5 | Water Log (10000) = Passed |
| 16-V-10[1] | 116.50 | Vis = 307 | |
| 4895[10] | 3.50 | FOG = 0 | |
| Example 34 | | | |
| Pigment (Ex. 11) | 77.50 | Tack = 16.8 | Water log test |
| 16-V-10[1] | 12.50 | Vis = 373 | (10,000 copies) |
| 6848[6] | 5.00 | FOG = 0 | Passed |
| | 5.00 | | |

[1]Varnish 16-V-10 (General Printing Ink Co.)
[2]Soy Dispersion Varnish #6727 (Superior Varnish & Drier Co.)
[3]Flushed Alkali blue R FL-16-435 (PMC Specialties Group, Inc.)
[4]Oregano clay Clayton AF (ECC International)
[5]20858 soy extender varnish (Kerely ink)11Quickset Alkali Blue 62-QR-0856 (BASF)
[6]Varnish #6848, 100% solid Quickset soy gel (Superior)
[7]Varnish #6849, 100% solid soya gloss varnish (Superior)
[8]Varnish #SVD 2023 (Superior)12Ulterax 47 - soya varnish - Lawter International
[9]Flush alkali blue R, FL-16-435 (PMC, Inc.)
[10]Varnish #4895 (100% solid soy varnish - Superior)
[11]Quickset Alkali Blue 62-QR-0856 (BASF)
[12]Ulterax 47 - soya varnish - Lawter International
[13]Ulterax 49 - soya varnish - Lawter International

TABLE III

| Ingredients | % |
|---|---|
| Example 35 | |
| Soy Bean Oil (Kerely) | 38.72 |
| Maleic modified rosin ester (Arizona - Beckacite XR4503) | 12.10 |
| Oxidized polyethylene homopolymer (Allied Signal - AC629) | 5.80 |
| Sunperse Rubine 57:1 pigment (Sun Chemical 219-0026) | 43.38 |
| Example 36 | |
| Soy Bean Oil (Kerely) | 40.00 |
| Maleic modified rosin ester (Arizona - Beckacite XR4503) | 14.00 |
| Oxidized polyethylene homopolymer (Allied Signal - AC629) | 6.00 |
| Alkali Blue (BASF 0147-4008) | 40.00 |

TABLE IV

| Ingredients | % |
|---|---|
| Example 37 | |
| Encapsulated Rubine Pigment (Example 35) | 50.00 |
| Soy Dispersion Varnish #6727 (Superior Varnish & Drier Co.) | 10.00 |
| Varnish 16-V-10 (General Printing Ink Co.) | 25.00 |
| Soy Bean Extender #20658 (Kerely Ink) | 5.00 |
| Polyethylene wax S-394-N1 (Shamrock Technologies Inc.) | 2.00 |
| Polytetrafluoroethylene PTFE SST-3P (Shamrock Technologies Inc.) | 1.00 |
| Cup Grease #3 (Magie Brother) | 3.00 |
| Tocopherol COVI-OX T70 (Henkel Corporation) | 0.50 |
| Organo Clay Clayton AF (ECC International) | 1.00 |
| Soy Bean Oil (Kerely Inc.) | 2.50 |

TABLE V

| Ingredients | % |
|---|---|
| Example 38 | |
| Soy Bean Oil (Kerely) | 40.00 |
| Maleic modified rosin ester (Arizona - Beckacite XR4503) | 14.00 |
| Polyethylene homopolymer (Allied Signal - A617) | 6.00 |
| Carbon Black (Mogul L, Cabot Corp.) | 36.00 |
| Alkali Blue pigment (BASF - 0147-4008) | 4.00 |
| Example 39 | |
| Soy Bean Oil (Kerely) | 40.00 |
| Maleic modified rosin ester (Arizona - Beckacite XR4503) | 12.00 |

TABLE V-continued

| Ingredients | % |
| --- | --- |
| Oxidized polyethylene homopolymer (Allied Signal-AC629) | 3.00 |
| Ethylene Acrylic acid calcium ionomer (Allied Signal Aclyn 201) | 1.00 |
| Carbon Black (Cabot, Mogul L) | 44.00 |
| Example 40 | |
| Soy Bean Oil (Kerely) | 40.00 |
| Maleic modified rosin ester (Arizona - Beckacite XR4503) | 10.00 |
| Oxidized polyethylene homopolymer (Allied Signal-JAC629) | 3.00 |
| Ethylene Acrylic acid calcium ionomer (Allied Signal Aclyn 201) | 0.10 |
| Carbon Black (Cabot, Mogul L) | 40.00 |
| Pigment Blue 27 (Manox-Manox blue 2MD) | 6.90 |
| Example 41 | |
| Soy Bean Oil (Kerely) | 40.00 |
| Maleic modified rosin ester (Arizona - Beckacite XR4503) | 10.00 |
| Oxidized polyethylene homopolymer (Allied Signal-AC629) | 5.50 |
| Ethylene Acrylic acid calcium ionomer (Allied Signal Aclyn 201) | 0.50 |
| Carbon Black (Cabot, Mogul L) | 44.00 |
| Example 42 | |
| Soy Bean Oil (Kerely) | 43.00 |
| Maleic modified rosin ester (Arizona - Beckacite XR4503) | 10.75 |
| Oxidized polyethylene homopolymer (Allied Signal-AC629) | 3.25 |
| Carbon Black (Cabot, Mogul L) | 43.00 |
| Example 43 | |
| Soy Bean Oil (Kerely) | 41.70 |
| Maleic modified rosin ester (Arizona - Beckacite XR4503) | 10.40 |
| Oxidized polyethylene homopolymer (Allied Signal-AC629) | 5.70 |
| Ethylene acrylic acid sodium ionomer (Allied Signal - Aclyn 276A) | 0.50 |
| Carbon Black (Cabot, Mogul L) | 41.70 |
| Example 44 | |
| Soy Bean Oil (Kerely) | 41.70 |
| Maleic modified rosin ester (Arizona - Beckacite XR4503) | 10.40 |
| Oxidized polyethylene homopolymer (Allied Signal-AC629) | 5.70 |
| Ethylene acrylic acid sodium ionomer (Allied Signal Aclyn 285A) | 0.50 |
| Carbon Black (Cabot, Mogul L) | 41.70 |
| Example 45 | |
| Soy Bean Oil (Kerely) | 40.00 |
| Maleic modified rosin ester (Arizona - Beckacite XR4503) | 15.00 |
| Oxidized polyethylene homopolymer (Allied Signal-AC629) | 2.50 |
| Ethylene acrylic acid sodium ionomer (Allied Signal Aclyn 276A) | 0.50 |
| Carbon Black (Cabot, Mogul L) | 42.00 |

TABLE VI

| Ingredients | % |
| --- | --- |
| Example 46 | |
| Encapsulated Carbon Black (Example 38) | 45.00 |
| Quickset Gel Miracle Gel #6684 (Superior Varnish & Drier Co.) | 15.00 |
| Varnish 16-V-10 (General Printing Ink Co.) | 20.00 |
| Soy Dispersion Varnish #6727 (Superior Varnish & Drier Co.) | 9.50 |
| Tocopherol COVI-OX T70 (Henkel Corporation) | 0.50 |
| Magnesium Silicate (Wittaker Inc.) | 4.00 |
| Organophilic Clay Bentone 500 (NL Chemicals) | 1.00 |
| Polyethylene wax S-394-N1 (Shamrock Technologies Inc.) | 2.00 |
| Polytetrafluoroethylene PTFE SST-3P (Shamrock Technologies Inc.) | 1.00 |
| Cup Grease #3 (Magie Brother) | 2.00 |
| Example 47 | |
| Encapsulated Carbon Black (Example 38) | 45.00 |
| Soy Dispersion Varnish #6727 (Superior Varnish & Drier Co.) | 10.00 |
| Soy Extender #20658 (Kerely Inc.) | 12.50 |
| Varnish 16-V-10 (General Printing Ink Co.) | 20.00 |
| Soy Varnish Ultrex 47 (Lawter International) | 11.00 |
| Polytetrafluoroethylene PTFE SST-3P (Shamrock Technologies Inc.) | 1.00 |
| Tocopherol COVI-OX T70 (Henkel Corporation) | 0.50 |
| Example 48 | |
| Encapsulated Carbon Black (Example 45) | 45.50 |
| Alkali Blue Flush 62-QR-0856 (BASF) | 3.00 |
| Milori Blue FL-17-654 (PMC Inc.) | 2.00 |
| Varnish SVD 2023 (Superior Varnish & Drier Co.) | 20.00 |
| Quickset Soya Gel #6848 (Superior Varnish & Drier Co.) | 10.00 |
| Grinding Vehicle #4895 (Superior Varnish & Drier Co.) | 10.00 |
| Cup Grease #3 | 2.00 |
| Polyethylene wax S-394-N1 (Shamrock Technologies Inc.) | 3.00 |
| Polytetrafluoroethylene PTFE SST-3P (Shamrock Technologies Inc.) | 1.50 |
| Hydrophobic fumed silica, Aerosil R972 (Degussa) | 1.00 |
| Tridecyl Alcohol Exal 13 (Exxon Corp.) | 1.00 |
| Soy Beam Oil (Kerely Inc.) | 1.00 |
| Example 49 | |
| Encapsulated Carbon Black (Example 39) | 48.50 |
| Quickset Gel Miracle Gel #6684 (Superior Varnish & Drier Co.) | 15.00 |
| Varnish 16-V-10 (General Printing Ink Co.) | 20.00 |
| Soy Dispersion Varnish #6727 (Superior Varnish & Drier Co.) | 10.00 |
| Organophilic Clay Bentone 500 (NL Chemicals) | 1.00 |

TABLE VI-continued

| Ingredients | % |
|---|---|
| Polyethylene wax S-394-N1 (Shamrock Technologies Inc.) | 2.00 |
| Tocopherol COVI-OX T70 (Henkel Corporation) | 0.50 |
| Polytetrafluoroethylene PTFE SST-3P (Shamrock Technologies Inc.) | 1.00 |
| Cup Grease #3 (Magie Brother) | 2.00 |
| Example 50 | |
| | |
| Encapsulated Carbon Black (Example 39) | 52.38 |
| Alkali Blue Flush 62-QR-0856 (BASF) | 4.76 |
| Quickset Gel Miracle Gel #6684 (Superior Varnish & Drier Co.) | 16.19 |
| Soy Dispersion Varnish #6727 (Superior Varnish & Drier Co.) | 9.52 |
| Varnish 16-V-10 (General Printing Ink Co.) | 10.95 |
| Organophilic Clay Bentone 500 (NL Chemicals) | 1.90 |
| Tocopherol COVI-OX T70 (Henkel Corporation) | 0.48 |
| Cup Grease #3 (Magie Brother) | 1.90 |
| Soy Bean Oil (Kerely Ink) | 1.90 |
| Example 51 | |
| | |
| Encapsulated Carbon Black (Example 39) | 55.00 |
| Alkali Blue Flush 62-QR-0856 (BASF) | 5.00 |
| Quickset Gel Miracle Gel #6684 (Superior Varnish & Drier Co.) | 15.00 |
| Soy Dispersion Varnish #6727 (Superior Varnish & Drier Co.) | 10.00 |
| Quickset Varnish Snapset #6367 (Superior Varnish & Drier Co.) | 11.50 |
| Organophilic Clay Bentone 500 (NL Chemicals) | 1.00 |
| Tocopherol COVI-OX T70 (Henkel Corporation) | 0.50 |
| Cup Grease #3 (Magie Brother) | 2.00 |
| Example 52 | |
| | |
| Encapsulated Carbon Black (Example 40) | 45.00 |
| Alkali Blue Flush 62-QR-0856 (BASF) | 4.50 |
| Quickset Gel Miracle Gel #6684 (Superior Varnish & Drier Co.) | 13.00 |
| Soy Dispersion Varnish #6727 (Superior Varnish & Drier Co.) | 9.00 |
| Varnish 16-V-10 (General Printing Ink Co.) | 18.00 |
| Organophilic Clay Bentone 500 (NL Chemicals) | 0.90 |
| Magnesium Silicate (Wittaker Inc.) | 2.70 |
| Polytetrafluoroethylene PTFE SST-3P (Shamrock Technologies Inc.) | 0.90 |
| Soy Bean Oil (Kerely Inc.) | 2.70 |
| Kodaflex TX1B Plasticizer (Eastman Chemicals) | 1.00 |
| Tocopherol COVI-OX T70 (Henkel Corporation) | 0.50 |
| Cup Grease #3 (Magie Brother) | 2.00 |
| Example 53 | |
| | |
| Encapsulated Carbon Black (Example 40) | 49.02 |
| Alkali Blue Flush 62-QR-0856 (BASF) | 3.92 |
| Quickset Gel Miracle Gel #6684 (Superior Varnish & Drier Co.) | 9.80 |
| Soy Dispersion Varnish #6727 (Superior Varnish & Drier Co.) | 11.76 |
| Varnish 16-V-10 (General Printing Ink Co.) | 14.71 |
| VersaFlow (Shamrock Technologies Inc.) | 0.49 |
| Hydrophobic fumed silica, Aerosil R972 (Degussa) | 0.98 |
| Polytetrafluoroethylene PTFE SST-3P (Shamrock Technologies Inc.) | 0.98 |
| Soy Bean Oil (Kerely Inc.) | 3.92 |
| Kodaflex TX1B Plasticizer (Eastman Chemicals) | 0.98 |
| Tocopherol COVI-OX T70 (Henkel Corporation) | 0.49 |
| Cup Grease #3 (Magie Brother) | 2.94 |
| Example 54 | |
| | |
| Encapsulated Carbon Black (Example 40) | 43.00 |
| Alkali Blue Flush 62-QR-0856 (BASF) | 2.00 |
| Pigment Blue 27, Manox blue (Manox Corporation) | 3.00 |
| Quickset Varnish Snapset #6367 (Superior Varnish & Drier Co.) | 25.00 |
| Quickset Gel Miracle Gel #6684 (Superior Varnish & Drier Co.) | 5.00 |
| Soy Dispersion Varnish #6727 (Superior Varnish & Drier Co.) | 15.00 |
| Oil base dispersion vehicle 100-SXL (Lawter International) | 2.00 |
| Organophilic Clay Bentone 500 (NL Chemicals) | 0.50 |
| Polytetrafluoroethylene PTFE SST-3P (Shamrock Technologies Inc.) | 1.00 |
| Kodaflex TX1B Plasticizer (Eastman Chemicals) | 1.00 |
| Tocopherol COVI-OX T70 (Henkel Corporation) | 0.50 |
| Cup Grease #3 (Magie Brother) | 2.00 |
| Example 55 | |
| | |
| Encapsulated Carbon Black (Example 41) | 41.03 |
| Alkali Blue Flush 62-QR-0856 (BASF) | 2.05 |
| Pigment Blue 27, Manox blue 2MD (Manox Corporation) | 3.08 |
| Varnish 16-V-10 (General Printing Ink Co.) | 20.51 |
| Soy Dispersion Varnish #6727 (Superior Varnish & Drier Co.) | 10.26 |
| Soy Extender #20658 (Kerely Inc.) | 10.26 |
| Quickset Gel Miracle Gel #6684 (Superior Varnish & Drier Co.) | 10.26 |
| Organophilic Clay Bentone 500 (NL Chemicals) | 0.51 |
| Cup Grease #3 (Magie Brother) | 2.05 |
| Example 56 | |
| | |
| Encapsulated Carbon Black (Example 41) | 40.00 |
| Alkali Blue Flush 62-QR-0856 (BASF) | 2.00 |
| Pigment Blue 27, Manox blue 2MD (Manox Corporation) | 2.50 |
| Varnish 16-V-10 (General Printing Ink Co.) | 20.00 |
| Soy Dispersion Varnish #6727 (Superior Varnish & Drier Co.) | 12.00 |
| Soy Extender #20658 (Kerely Inc.) | 10.00 |
| Quickset Gel Miracle Gel #6684 (Superior Varnish & Drier Co.) | 10.00 |
| Tridecyl Alcohol, Exal 13 (Exxon Corporation) | 1.00 |
| Tocopherol COVI-OX T70 (Henkel Corporation) | 0.50 |
| Kodaflex TX1B Plasticizer (Eastman Chemicals) | 1.00 |
| Soy Bean Oil (Kerely Ink) | 1.00 |
| Cup Grease #3 (Magie Brother) | 2.00 |
| Example 57 | |
| | |
| Encapsulated Carbon Black (Example 41) | 40.00 |
| Alkali Blue Flush 62-QR-0856 (BASF) | 2.00 |
| Pigment Blue 27, Manox blue 2MD (Manox Corporation) | 2.00 |
| Varnish 16-V-10 (General Printing Ink Co.) | 20.00 |
| Soy Dispersion Varnish #6727 (Superior Varnish & Drier Co.) | 15.00 |
| Soy Extender #20658 (Kerely Inc.) | 10.00 |
| Tocopherol COVI-OX T70 (Henkel Corporation) | 0.50 |
| Tridecyl Alcohol, Exal 13 (Exxon Corporation) | 1.00 |
| Cup Grease #3 (Magie Brother) | 2.00 |
| Example 58 | |
| | |
| Encapsulated Carbon Black (Example 43) | 45.00 |
| Alkali Blue Flush 62-QR-0856 (BASF) | 2.00 |
| Pigment Blue 27, Manox blue 2MD (Manox Corporation) | 3.00 |
| Varnish 16-V-10 (General Printing Ink Co.) | 18.50 |
| Soy Dispersion Varnish #6727 (Superior Varnish & Drier Co.) | 15.00 |
| Quickset Gel Miracle Gel #6684 (Superior Varnish & Drier Co.) | 10.00 |

TABLE VI-continued

| Ingredients | % |
|---|---|
| Tocopherol COVI-OX T70 (Henkel Corporation) | 0.50 |
| Organophilic Clay Bentone 500 (NL Chemicals) | 1.00 |
| Smoother Compound (AB Dick, 3-8100) | 2.00 |
| Tridecyl Alcohol, Exal 13 (Exxon Corporation) | 1.00 |
| Cup Grease #3 (Magie Brother) | 2.00 |
| Example 59 | |
| Encapsulated Carbon Black (Example 44) | 45.00 |
| Alkali Blue Flush 62-QR-0856 (BASF) | 2.00 |
| Pigment Blue 27, Manox blue 2MD (Manox Corporation) | 3.00 |
| Varnish 16-V-10 (General Printing Ink Co.) | 18.50 |
| Soy Dispersion Varnish #6727 (Superior Varnish & Drier Co.) | 15.00 |
| Quickset Gel Miracle Gel #6684 (Superior Varnish & Drier Co.) | 10.00 |
| Tocopherol COVI-OX T70 (Henkel Corporation) | 0.50 |
| Organophilic Clay Bentone 500 (NL Chemicals) | 1.00 |
| Smoother Compound (AB Dick, 3-8100) | 2.00 |
| Tridecyl Alcohol, Exal 13 (Exxon Corporation) | 1.00 |
| Cup Grease #3 (Magie Brother) | 2.00 |
| Example 60 | |
| Encapsulated Carbon Black (Example 42) | 45.00 |
| Alkali Blue Flush 62-QR-0856 (BASF) | 2.00 |
| Pigment Blue 27, Manox blue 2MD (Manox Corporation) | 3.00 |
| Varnish 16-V-10 (General Printing Ink Co.) | 18.50 |
| Soy Dispersion Varnish #6727 (Superior Varnish & Drier Co.) | 15.00 |
| Quickset Gel Miracle Gel #6684 (Superior Varnish & Drier Co.) | 10.00 |
| Tocopherol COVI-OX T70 (Henkel Corporation) | 0.50 |
| Organophilic Clay Bentone 500 (NL Chemicals) | 1.00 |
| Smoother Compound (AB Dick, 3-8100) | 2.00 |
| Tridecyl Alcohol, Exal 13 (Exxon Corporation) | 1.00 |
| Cup Grease #3 (Magie Brother) | 2.00 |

CARBON BLACK

| Ingredients | Example # | | | | | | | |
|---|---|---|---|---|---|---|---|---|
| | 38 | 39 | 40 | 41 | 42 | 43 | 44 | 45 |
| Soy bean oil | yes | yes | yes | yes | yes | yes | yes | yes |
| XR 4503 | yes | yes | yes | yes | yes | yes | yes | yes |
| Polyethylene | yes | yes | yes | yes | yes | yes | yes | yes |
| Ionomer | no | yes | no | yes | no | yes | yes | yes |
| Alkali Blue | yes | no | yes | no | no | no | no | no |
| Carbon Black | yes | yes | yes | yes | yes | yes | yes | yes |
| Example No. of the Ink | 46 47 | 49 50 51 | 52 53 54 | 55 56 57 | 60 | 58 | 59 | 48 |

Significant improvement in the functional properties of the ink was observed when the encapsulated carbon black contained ionomers.

MAGNETIC

| Ingredients | Example # | | | | | | | | | |
|---|---|---|---|---|---|---|---|---|---|---|
| | 2 | 3 | 4 | 5 | 6 | 7 | 8 | 9 | 10 | 11 |
| Soy bean oil | yes | yes | yes | yes | yes | yes | yes | yes | yes | yes |
| XR 4503 | yes | yes | no | yes | yes | yes | yes | yes | yes | yes |
| Polyethylene | yes | yes | yes | yes | yes | yes | yes | yes | yes | yes |
| Ionomer | no | no | no | yes | yes | yes | yes | yes | yes | yes |
| Alkali Blue | no | no | no | no | no | no | yes | yes | yes | yes |
| Iron Oxide | yes | yes | yes | yes | yes | yes | yes | yes | yes | yes |
| Example No. of the Ink | 12 13 14 | | 15 | | 16 17 18 19 20 21 | 22 23 24 25 30 | 26 27 28 29 31 | 32 33 | | 34 |

Remarks
2-Examples Nos. 8, 10 & 11 are also identical.
3-Significant improvement in the ink's functional properties was observed when the encapsulated iron oxide contains the ionomers and XR4503 resins.
4-Ink's Physicals:
Tack:
was measured by an inkometer (from Thawing Albert) at 1200 RPM, 90 F., and after 1 min.
Viscosity:
was measured by Laray viscometer at 25 C.
Finess of Grind
was measured by precession grind gage
5-Press evaluation of the inks:
Water Log test:
All inks were tested on A.B. Dick duplicator equipped with either an integrated or segregated dampening system. The press was operated at maximum speed of 9,000–10,000 copies per hour for a total of 10,000 copies.
Signal strength:
The magnetic strength of the magnetic inks was measured using RDM MICR

| | MAGNETIC | | | | | | | | | |
|---|---|---|---|---|---|---|---|---|---|---|
| | Example # | | | | | | | | | |
| Ingredients | 2 | 3 | 4 | 5 | 6 | 7 | 8 | 9 | 10 | 11 | qualifier from research development & manufacturing corporation.
Prints quality:
All inks were tested on A.B. Dick duplicator and presses using metal, silvermaster and maega plates and their corresponding chemistry.

What is claimed is:

1. A printing ink composition comprising a printing ink vehicle and from about 1 to 99 percent, based on the total weight of the ink, of coated magnetic particles, said particles having a particle diameter from about 0.1 to 100 microns and having a solid coating on the surface of the particles, said coating comprising an ionomer, said ink being free of volatile organic solvents.

2. A printing ink comprising a printing ink vehicle and from about 1 to 99 percent, based on the total weight of the ink, of coated particles selected from the group consisting of magnetic particles, pigments and carbon blank, said particles having a particle diameter from about 0.1 to 100 microns and having a solid coating on the surface of the particles, said coating being present in an amount from about 10 to about 80 percent, by weight, based upon the total weight of the coated particle, said coating comprising an oil, said ink being free of volatile organic solvents.

3. The printing ink of claim 2 wherein the particles are magnetic particles.

4. The printing ink of claim 2 wherein the particles are pigments.

5. The printing ink of claim 2 wherein the particles are carbon black particles.

6. The ink of claim 2 wherein the oil is a vegetable oil.

7. The ink of claim 6 wherein the oil is soya oil.

* * * * *